(12) United States Patent
Gallucci et al.

(10) Patent No.: US 9,856,443 B2
(45) Date of Patent: *Jan. 2, 2018

(54) PROCESSES AND COMPOSITIONS FOR CLEANING MIXING DEVICES TO IMPROVE POLYMER PRODUCTION

(71) Applicant: SABIC GLOBAL TECHNOLOGIES B.V., Bergen op Zoom (NL)

(72) Inventors: Robert Russell Gallucci, Mount Vernon, IN (US); Franklin Ehrensbeck, Evansville, IN (US)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 47 days.

This patent is subject to a terminal disclaimer.

(21) Appl. No.: 15/061,384

(22) Filed: Mar. 4, 2016

(65) Prior Publication Data

US 2016/0186104 A1 Jun. 30, 2016

Related U.S. Application Data

(62) Division of application No. 13/774,524, filed on Feb. 22, 2013, now Pat. No. 9,347,026.

(60) Provisional application No. 61/604,070, filed on Feb. 28, 2012, provisional application No. 61/659,766, filed on Jun. 14, 2012.

(51) Int. Cl.
| | |
|---|---|
| *C11D 3/37* | (2006.01) |
| *C11D 11/00* | (2006.01) |
| *C11D 1/22* | (2006.01) |
| *B08B 7/00* | (2006.01) |
| *B29C 47/08* | (2006.01) |
| *C11D 1/14* | (2006.01) |
| *C11D 1/24* | (2006.01) |
| *C11D 1/29* | (2006.01) |
| *C11D 9/22* | (2006.01) |
| *B29C 47/92* | (2006.01) |

(52) U.S. Cl.
CPC ........ *C11D 11/0041* (2013.01); *B08B 7/0064* (2013.01); *B08B 7/0071* (2013.01); *B29C 47/0877* (2013.01); *B29C 47/92* (2013.01); *C11D 1/146* (2013.01); *C11D 1/22* (2013.01); *C11D 1/24* (2013.01); *C11D 1/29* (2013.01); *C11D 3/37* (2013.01); *C11D 3/3707* (2013.01); *C11D 3/3715* (2013.01); *C11D 3/3719* (2013.01); *C11D 3/3749* (2013.01); *C11D 9/225* (2013.01); *B29C 2947/9299* (2013.01); *B29C 2947/92704* (2013.01)

(58) Field of Classification Search
CPC ....... C11D 11/0041; C11D 1/146; C11D 3/37; C11D 9/225; B08B 7/0071
See application file for complete search history.

(56) References Cited

U.S. PATENT DOCUMENTS

| | | | |
|---|---|---|---|
| 3,803,085 A | 4/1974 | Takehoshi et al. | |
| 3,905,942 A | 9/1975 | Takekoshi et al. | |
| 4,176,222 A | 11/1979 | Cinderey et al. | |
| 4,838,945 A | 6/1989 | Fujii et al. | |
| 4,838,948 A | 6/1989 | Bailey | |
| 4,894,416 A | 1/1990 | Gallucci | |
| 4,954,545 A | 9/1990 | Bailey | |
| 5,087,653 A | 2/1992 | Obama et al. | |
| 5,238,608 A | 8/1993 | Obama et al. | |
| 5,395,456 A | 3/1995 | Abrams et al. | |
| 5,719,233 A | 2/1998 | Gallucci et al. | |
| 5,723,539 A | 3/1998 | Gallucci et al. | |
| 6,235,821 B1 | 5/2001 | Saito | |
| 6,545,089 B1 | 4/2003 | Derudder et al. | |
| 6,605,659 B2 | 8/2003 | Blackburn et al. | |
| 7,041,773 B2 | 5/2006 | Gallucci et al. | |
| 7,300,742 B2 | 11/2007 | Gallucci et al. | |
| 8,029,717 B2 | 10/2011 | Nakamura et al. | |
| 8,034,857 B2 | 10/2011 | Kailasam et al. | |
| 8,119,761 B2 | 2/2012 | Crawford et al. | |
| 8,729,003 B2* | 5/2014 | Gallucci ................. | C11D 1/24 510/188 |
| 9,347,026 B2* | 5/2016 | Gallucci ................. | C11D 1/24 |
| 2009/0118406 A1 | 5/2009 | Tomoda | |
| 2011/0214699 A1 | 9/2011 | Sasai | |
| 2012/0095141 A1 | 4/2012 | Tanabe et al. | |
| 2012/0142835 A1 | 6/2012 | Wakita | |

FOREIGN PATENT DOCUMENTS

| | | |
|---|---|---|
| CN | 101245290 A | 8/2008 |
| CN | 101462352 A | 6/2009 |
| DE | 102007015214 A1 | 10/2008 |
| EP | 0399445 A1 | 11/1990 |
| JP | 1995041658 B2 | 5/1995 |
| JP | 7080191 B2 | 8/1995 |
| JP | 11181480 A | 7/1999 |
| JP | 2003276072 A | 9/2003 |
| JP | 2012006197 A | 1/2012 |

OTHER PUBLICATIONS

Chan et al.; "Facile Quantitative Analysis of Hydroxyl End Groups of Poly(2,6-dimethyl-1,4-phenylene oxide)s by 31P NMR Spectroscopy"; Macromolecules; vol. 27; 1994; pp. 6371-6375.

Chao; "A 31P NMR Study of Poly(phenylene oxide) (PPO)(1) Resin's Hydroxyl End Groups"; Polymer Bulletin; vol. 17; 1987; pp. 397-401.

English Abstract of JP11181480(A); Date of Publication: Jul. 6, 1999; 1 Page.

English Abstract of JP2012006197(A); Date of Publication: Jan. 12, 2012; 1 Page.

English Abstract of JP7080191B2; Date of Publication: Aug. 30, 1995; 1 Page.

(Continued)

*Primary Examiner* — Gregory Webb
(74) *Attorney, Agent, or Firm* — Cantor Colburn LLP

(57) ABSTRACT

A cleaning mixture comprising polymeric resin pellets having a Rockwell R hardness of 85 to 140, water, and a surfactant salt comprising at least one of sulfonate salts, $C_6$ to $C_{36}$ carboxylic acid salts, or mixtures thereof, is used to purge the mixing device. The cleaning mixture has a pH of 6.0 to 9.0.

19 Claims, No Drawings

(56) References Cited

OTHER PUBLICATIONS

German Patent No. 102007015214 (A1); Publication Date: Oct. 2, 2008; Abstract Only; 1 Page.
International Search Report; International Application No. PCT/US2013/027231; International Filing Date: Feb. 23, 2013; Date of Mailing: Jun. 25, 2013; 5 Pages.
Japanese Patent No. 02-206635 (A); Publication Date: Aug. 16, 1990; Abstract Only; 1 Page.
Japanese Patent No. 05-098072 (A); Publication Date: Apr. 20, 1993; Abstract Only; 1 Page.
Japanese Patent No. 2006219568 (A); Publication Date: Aug. 24, 2006; Abstract Only; Document No. XP-002698771; 1 Page.
Japanese Patent No. 2007119554 (A); Publication Date: May 17, 2007; Abstract Only; Document No. XP-002698862; 1 Page.
Japanese Patent No. 2009143167 (A); Publication Date: Jul. 2, 2009; Abstract Only; Document No. XP-002698770; 1 Page.
Japanese Patent No. JPH08234275; Date of Publication: Sep. 13, 1996; Machine Translation; 10 Pages.
Japanese Patent No. S62117712 (A); Publication Date: May 29, 1987; Abstract Only; Document No. XP-002698863; 1 Page.
Machine Translation of CN101462352; Date of Publication: Jun. 24, 2009; 22 Pages.
Written Opinion of the International Searching Authority; International Application No. PCT/US2013/027231; International Filing Date: Feb. 23, 2013; dated Jun. 25, 2013; 5 Pages.
Machine Translation of CN101245290(A); Date of Publication: Aug. 20, 2008; 16 Pages.

\* cited by examiner

PROCESSES AND COMPOSITIONS FOR CLEANING MIXING DEVICES TO IMPROVE POLYMER PRODUCTION

CROSS REFERENCE TO RELATED APPLICATIONS

The present application is a divisional application of U.S. patent application Ser. No. 13/774,524, filed Feb. 22, 2013, which claims priority to U.S. Provisional Application Ser. No. 61/604,070, filed Feb. 28, 2012, and U.S. Provisional Application Ser. No. 61/659,766, filed Jun. 14, 2012, the contents of which are incorporated herein by reference.

BACKGROUND

The present disclosure relates to processes for cleaning mixing devices that are used to make thermoplastic polymers and polymer blends. The processes aim to increase the speed of the cleaning process, provide lower resin degradation, and allow for a higher overall extrusion rate. The disclosure also relates to purge compositions useful in such processes.

Extruders using a melt conveying screw accomplish a large portion of the melt processing of thermoplastic resins. The extruder can be used for compounding, molding, pelletization or forming films, sheets or profiles. Such extruders typically have a heated extrusion barrel and one or two screws revolving within the barrel to compress, melt, and extrude the resin through an orifice or die. The barrel is divided into several different zones, such as feed, transition, mixing, dispersion, and metering zones. When such machines are dedicated to making a single material in a single color, they can be very efficient. However, when the same machine is used to make a variety of materials and/or colors, there is a need to changeover or switch between materials (i.e. changeover process). Otherwise in this situation, impurities or residues created during the extrusion of the first, preceding resin can contaminate the second, succeeding resin. During this changeover process, the extruder produces a combination of the preceding material/color and the succeeding material/color. As a result, the combination may not meet desired specifications, e.g. compositional differences, a loss of clarity, a change in color or viscosity, or some other defect. In addition, the changeover process leads to a loss of material and a decrease in manufacturing efficiency.

These deficiencies have been addressed to some extent in several ways. For instance, a high viscosity or sticky resin has been used to push out the old material. While this can be effective, the high viscosity resin itself must be pushed out of the machine, leading to inefficiency. In other instances, fiber glass reinforced resins are used as a purge compound to clean out the extruder. While effective in some systems, this process again leaves the problem of removing the fiber glass resin itself.

In other instances resins such as polymethylmethacrylate based purge compounds (commercially sold as RIDD) are used to purge melt processing equipment at high temperatures (e.g. over 250 degrees Celsius (° C.)). These resins give off objectionable odoriferous fumes that cause irritation to the operators and those around them, and are increasingly unacceptable in a modern manufacturing environment.

Thus, there exists a need for processes and compositions to quickly changeover a screw-based melt processing machine from one polymeric material to another polymeric material in a short period of time, with no degradation of the polymer and with no fumes due to their use. Desirably, the process/composition should be applicable for cleaning a wide variety of contaminants, especially colorants such as carbon black, titanium dioxide, anthraquinone and phthalocyanine-based pigments and dyes as well as removing black specks, crosslinked resins, and gels caused by degradation of resins or additive during melt compounding and melt processing.

BRIEF DESCRIPTION

Disclosed herein are cleaning mixtures and processes using cleaning mixtures.

In an embodiment, a process to clean melt processing equipment (e.g., used to compound, mold, and/or extrude resins containing a polymer), comprises: purging the melt processing equipment with a cleaning mixture (purge) and running the melt processing equipment at a temperature of from 200 to 380° C. to obtain a purged resin while cleaning the melt processing equipment. The cleaning mixture (purge) comprises: from 70 to 99 wt % of thermoplastic polymeric resin pellets, the pellets having a Rockwell R hardness of from 85 to 140 as measured by ASTM D785; and from 1 to 30 wt % of an aqueous solution that contains 0.2 to 30 wt % of a surfactant salt selected from at least one of the following: sulfonate salts, alkyl aryl sulfonate salts, alkyl sulfate salts, C6 to C36 carboxylic acid salts, and mixtures thereof, wherein the aqueous solution has a pH of 6.0 to 9.0.

In an embodiment, a cleaning mixture, comprises: water; thermoplastic polymeric resin pellets having a Rockwell R hardness of from 85 to 140 as measured by ASTM D785; and a surfactant salt selected from at least one of the following: sulfonate salts, alkyl aryl sulfonate salts, alkyl sulfate salts, C6 to C36 carboxylic acid salts, and mixtures thereof; wherein the cleaning mixture has a pH from 6.0 to 9.0.

These and other non-limiting characteristics are more particularly described below.

DETAILED DESCRIPTION

The present disclosure can be understood more readily by reference to the following detailed description of desired embodiments and the examples included therein. In the following specification and the claims which follow, reference will be made to a number of terms which shall be defined to have the following meanings.

The singular forms "a," "an," and "the" include plural referents unless the context clearly dictates otherwise.

As used in the specification and in the claims, the term "comprising" can include the embodiments "consisting of" and "consisting essentially of."

Numerical values in the specification and claims of this application, particularly as they relate to polymers or polymer compositions, reflect average values for a composition that can contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

As used herein, approximating language can be applied to modify any quantitative representation that can vary without resulting in a change in the basic function to which it is related. Accordingly, a value modified by a term or terms, such as "substantially," is not limited to the precise value specified. In at least some instances, the approximating language can correspond to the precision of an instrument for measuring the value.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, the aldehyde group —CHO is attached through the carbon of the carbonyl group.

The term "alkyl" refers to a linear or branched array of atoms that is composed exclusively of carbon and hydrogen. The array of atoms can include single bonds, double bonds, or triple bonds (typically referred to as alkane, alkene, or alkyne). Alkyl groups can be substituted (i.e. one or more hydrogen atoms is replaced) or unsubstituted. Exemplary alkyl groups include, but are not limited to, methyl, ethyl, and isopropyl.

The term "aryl" refers to an array of atoms having a valence of at least one and comprising at least one aromatic group. The array of atoms can include heteroatoms such as sulfur, and oxygen, or can be composed exclusively of carbon and hydrogen. Aromatic groups are not substituted. Exemplary aromatic groups include, but are not limited to, phenyl, naphthyl, biphenyl, and diphenyl ether.

In the definitions above, the term "substituted" refers to at least one hydrogen atom on the named radical being substituted with another functional group, such as alkyl, halogen, —OH, —CN, —NO$_2$, —COOH, etc.

The present disclosure relates to the discovery that the use of a viscous aqueous salt mixture externally coated onto a pelletized thermoplastic resin polymer with a Rockwell R hardness of 85 to 140, is surprisingly effective in cleaning the mixing device. The cleaning time is much faster, there is less degradation of resin, and extrusion can occur at a higher rate.

Disclosed in embodiments is a process to clean melt processing equipment used to compound, mold, or extrude thermoplastic resins. The melt processing equipment is purged with a cleaning mixture (purge mixture) comprising from 70 to 99 weight percent (wt %) of thermoplastic resin pellets and from 1 to 30 wt % of an aqueous surfactant salt solution. The aqueous surfactant salt solution can contain at least one of the following salts: sulfonate salts, alkyl aryl sulfonate salts, alkyl sulfate salts, and C6 to C36 carboxylic acid salts, e.g., wherein the salt is present in the aqueous solution at 5 to 30 wt % of the solution. The aqueous solution has a pH of 6.0 to 9.0. In some instances the cleaning mixture can have a pH of 6.0 to 7.9. In other instances, the pH can be from 6.5 to 7.5, or in yet other instances the pH can be slightly acidic from 6.0 to 6.9. The melt processing equipment is heated to a temperature of from 200 to 380° C. The cleaning mixture is then run through the equipment. The resulting thermoplastic purge resin after extrusion (formed from the pellets in the cleaning mixture with the aqueous surfactant salt solution) can have a weight average molecular weight (Mw) within 30% of the Mw of the thermoplastic resin pellets before purging. The cleaning mixture can readily be prepared when needed at the processing equipment. After the cleaning mixture is run through the equipment, the equipment can be further cleansed with a clean out resin that comprises a thermoplastic resin but does not contain the aqueous surfactant salt solution.

Also disclosed is a cleaning mixture that consists essentially of water; thermoplastic polymeric resin pellets having a Rockwell R hardness of from 85 to 140 as measured by ASTM D785; and at least one of the following salts: sulfonate salts, alkyl aryl sulfonate salts, alkyl sulfate salts, C6 to C36 carboxylic acid salts, and mixtures thereof. The cleaning mixture has a pH from 6.0 to 9.0.

It has been found that sulfonate salts, alkyl aryl sulfonate salts, alkyl sulfate salts, and C6 to C36 carboxylic acid salts in an aqueous solution having a viscosity of 20 to 1000 centipoise as measured by ASTM D445 at 23° C., externally coated onto a specific type of thermoplastic pellet, can be used to clean or purge melt mixing devices. Such devices are typically used to compound, mold, or extrude resin. After cleaning/purging, the device can be used for processing of a subsequent polymeric resin without degrading the polymeric resin. The changeover time (i.e. the time needed to clean the equipment of a first resin in order to begin processing a second different resin) is significantly decreased.

In embodiments, the cleaning mixture/purge mixture used for cleaning/purging comprises (a) at least one of the following salts sulfonate salts, alkyl aryl sulfonate salts, alkyl sulfate salts, C6 to C36 carboxylic acid salts, and mixtures thereof, (b) at least one polymeric resin pellet, and (c) water. The cleaning mixture has a pH of from 6.0 to 9.0. The cleaning mixture should be free of (i.e. contain less than 100 parts per million by weight (ppm) of) ammonium salts, amines, amino acids, carbonate salts, bicarbonate salts, formaldehyde, poly formaldehyde, formalin, ethanol, or methanol. The cleaning mixture can be run through the mixing device to remove one or more of polymeric residue, contaminants, or colorants present in the device.

The cleaning mixture containing liquid and pellets described herein can be used as a purging solution for any type of mixing device, including compound extruders, sheet and film extruders, molding machines, and any other device which can be used to melt process a thermoplastic polymeric resin. The purging processes of this disclosure are especially useful in screw conveying continuous melt processing equipment such as extruders, including compounding equipment, melt pumps, injection molding machines, film, sheet and profile extruders and blow molding machines. The cleaning mixture is especially effective in intermeshing twin screw extruders. The term "mixing device" is used herein to refer to any such device that can be used in the processing of thermoplastic polymeric resins. In some instances, the melt processing device is a single or twin screw extruder with a screw length/diameter (L/D) ratio from 20:1 to 40:1 and a screw diameter from 0.5 to 8.0 inches (1.3 to 20 centimeters (cm)). In other instances during purging the extruder is run at a speed of 50 to 100 revolutions per minute (rpm) and a temperature of 200 to 380° C. In other instance the melt processing equipment is run at 250 to 350° C. In other instances the melt processing device is a single screw extruder having a screw diameter from 0.5 to 8.0 inches (1.3 to 20 cm) that is part of a thermoplastic molding machine. In other instances the single screw melt processing device is a molding machine that can be at least one of the following; an injection molding machine, a blow molding machine, an injection-blow molding machine, an extrusion-blow molding machine, a stretch-blow molding machine, a gas assist molding machine, a hydraulic molding machine, a mechanical molding machine and an electric molding machine.

The cleaning mixture contains a surfactant salt. The surfactant salt can be at least one of the following salts sulfonate salts, alkyl aryl sulfonate salts, alkyl sulfate salts, C6 to C36 carboxylic acid salts, and mixtures thereof.

A sulfonate salt contains at least one sulfonate ($SO_3^-$) group. Alkyl aryl sulfonate salts are a subset of the group of sulfonate salts, and in addition to containing at least one sulfonate group also contain an aryl group and at least one alkyl group (i.e., an alkyl-substituted aryl group).

In some embodiments, the alkyl aryl sulfonate salt can have the general structure of Formula (A):

  Formula (A)

wherein each R is independently alkyl having from 1 to 36 carbon atoms; x is an integer indicating the number of R groups, and is from 1 to 10; M is an alkali metal or alkaline earth metal cation; p is the number of sulfonate groups; and q is the number of cations required to neutralize the sulfonate groups. In certain embodiments, p is from 1 to 3, and q is also from 1 to 3. The sulfonate salt group is directly bonded to an aromatic ring. At least one alkyl group is present in the alkyl aryl sulfonate salt. In more particular embodiments, the at least one alkyl group contains from 6 to 36 carbon atoms.

The alkyl aryl sulfonate salt generally contains one or more alkali metal or alkaline earth metal cations. Exemplary cations include sodium ($Na^+$), potassium ($K^+$), and mixtures thereof. Similarly, the sulfonate salt can contain one, two, three, or more sulfonate groups.

In embodiments, the aryl group of the sulfonate salt is a phenyl, naphthyl, biphenyl, or diphenyl ether group. Salts having these aryl groups are depicted below as Formulas (B), (C), (D), and (E):

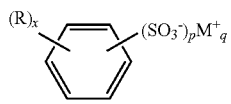  Formula (B)

alkyl benzene sulfonate salt

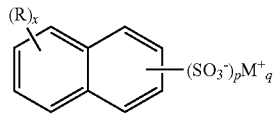  Formula (C)

alkyl naphthalene sulfonate salt

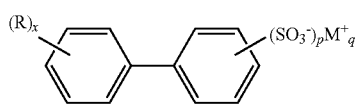  Formula (D)

alkyl biphenyl sulfonate salt

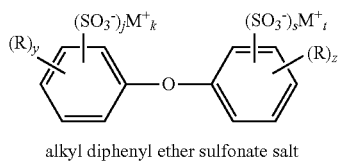  Formula (E)

alkyl diphenyl ether sulfonate salt wherein R, M, p, and q are as previously described; y+z is from 1 to 5; and j+s is from 1 to 3. In certain embodiments, y=0 and s=0, i.e. the alkyl and sulfonate groups are on separate rings in Formula (E).

In specific embodiments of Formula (B), p=q=1. In specific embodiments of Formula (E), j=k=s=t=1 and y=z.

In specific embodiments, the alkyl aryl sulfonate salt is an alkyl benzene sulfonate salt. The sulfonate salt can have the structure of Formula (F):

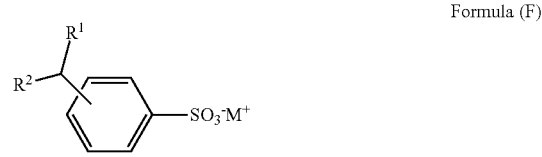  Formula (F)

where M is an alkali metal or alkaline earth metal cation; $R^1$ is an alkyl group containing from 5 to 35 carbon atoms; and $R^2$ is hydrogen or an alkyl group containing from 1 to 12 carbon atoms, with $R^1$ and $R^2$ having no more than 36 total carbon atoms. This type of branched alkyl aryl sulfonate salt is preferred in some instances since the alkyl branching allows for more facile biological degradation of the cleaning solution component if the purge is sent to standard waste water treatment facilities. In specific embodiments, the alkyl aryl sulfonate salt is sodium dodecyl benzene sulfonate.

A C6 to C36 carboxylic acid salt contains a carboxylic acid group and an alkyl chain having from 6 to 36 carbon atoms. The alkyl group can be linear or branched. These types of carboxylic acid salts are also sometimes referred to as soaps. A carboxylic acid salt can have the general structure of Formula (G):

  Formula (G)

wherein R is alkyl having from 6 to 36 carbon atoms; and M is an alkali metal cation. In many instances these salts will have a sodium or potassium cation. Exemplary carboxylic acid salts include, for example, sodium oleate, potassium oleate, potassium laurate, potassium myristate, and mixtures thereof. In some instances, the carboxylic acid salt will show greater than or equal to 5% solubility in water at 23° C. In other instances, the solubility in water will be greater than or equal to 20%. In yet other instances, the carboxylic acid salt will form a uniform, stable aqueous slurry that can be used to coat the pellets to make the cleaning mixture.

An alkyl sulfate salt contains at least one alkyl group and at least one sulfate ($SO_4^{2-}$) group. An alkyl sulfate salt can have the general structure of Formula (H):

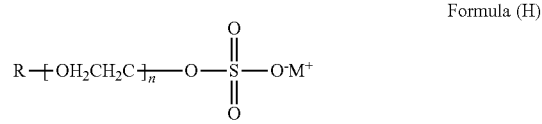  Formula (H)

wherein R is alkyl having from 6 to 36 carbon atoms; M is an alkali metal cation; and n is from 0 to 4. R can be linear or branched. In many instances the alkyl sulfate salt will have a sodium or potassium cation. Examples of suitable alkyl sulfate salts include sodium lauryl sulfate (CAS#151-21-3), lithium dodecyl sulfate (CAS#2044-56-6), sodium octyl sulfate (CAS#142-31-4), sodium lauryl ether sulfate (SLES), potassium decyl sulfate, sodium ethyl hexyl sulfate, sodium myristyl sulfate, sodium diethylene glycol myristyl ether sulfate (CAS#25446-80-4), sodium trideceth sulfate (CAS#25446-78-0), and mixtures thereof. In some instances, the alkyl sulfate salt will show greater than or equal to 5% solubility in water at 23° C. In other instances, the solubility in water will be greater than or equal to 20%. In yet other instances, the alkyl sulfate salt will form a uniform, stable aqueous slurry that can be used to coat the pellets to make the cleaning mixture.

The surfactant salt is typically added to the cleaning mixture as an aqueous solution which contains from 5 to 30 wt % of the surfactant salt (based on the weight of the aqueous solution), or from 10 to 30 wt %, or from 15 to 30 wt %. The aqueous solution can have a pH of from 6.0 to 9.0, in other instances from 6.0 to 7.0, or from 6.0 to 6.9 (i.e. slightly acidic).

In the preparation of the sulfonate salts, alkyl aryl sulfonate salts, alkyl sulfate salts, or C6 to C36 carboxylic acid salts, care should be taken to prevent over neutralization. Over neutralization of the salt would result in the aqueous solution having a pH above 7.0, in some instances higher than 8.0. In some instances the amount of base used to form the salt for the neutralization of the sulfonic acid, alkyl aryl sulfonic acid, alkyl sulfonic acid, C6 to C36 carboxylic acids should be stoichiometrically less than the corresponding acid. For example, the alkyl aryl sulfonic acid or other acids should be neutralized to 85.0 to 99.5%.

In some embodiments, the aqueous solution (and the cleaning mixture) is substantially free of antimicrobial additives (e.g. formaldehyde and ammonia). The aqueous solution (and the cleaning mixture) can contain less than 100 ppm of antimicrobial additives. In some instances it will be beneficial to have an aqueous solution (and cleaning mixture) that has less than 100 ppm of amines, amino acids, formaldehyde, formalin, polyformaldehyde, ammonia or ammonium salts that can decompose on melt processing at 250 to 380° C. to give objectionable or dangerous fumes. In other instances the soap solution (and the cleaning mixture) will have less than 1% of carbonate or bicarbonate salts that can generate carbon dioxide and cause excessive foaming during purging at 200 to 380° C. Likewise having low phosphate content (less than 100 ppm phosphate in the aqueous solution/cleaning mixture) will be important in complying with environmental regulations regarding phosphate release to waterways.

In some instances it is desirable that the surfactant salt not decompose during the high temperature purging process. Thermal gravimetric analysis (TGA), for example ASTM method E1868-10, can be used to measure the stability of the sulfonate salts, alkyl aryl sulfonate salts, alkyl sulfate salts and C6 to C36 carboxylic acid salts. The test will be done under nitrogen with a heating rate of 20° C./minute with the sample heated from room temperature to 800° C. The surfactant salt is initially weighed at room temperature, then heated. At 250° C., the surfactant salt should show less than 20% weight loss from the initial dry weight. In other instances the weight loss will be less than 10% of the initial dry weight. The initial weight should be based on the dry weight of the surfactant salt substantially free of any absorbed water. In some instances the ash/residue of the surfactant salt will be less than 10% of the original weight. In yet other instances the ash/residue of the soap will be less than 5% of the original weight.

In yet other instances the aqueous surfactant salt solution will have less than 5% flammable liquids such as ethanol, methanol, acetone, and the like. Higher levels of a flammable liquid in the surfactant salt solution could case fire issues when used in hot melt processing equipment operated above the flash point of the flammable liquid in the presence of air.

The cleaning mixture (purge) also includes at least one thermoplastic polymeric resin pellet. For purposes of this application, the term "pellet" should be interpreted as referring to a solid material having a minimum length in at least one dimension of at least 2 millimeters (mm). In contrast, a "powder" has a maximum length in any dimension of 2 mm. Pellet size can be measured by any conventional method including physical measurement of a representative group of pellets using a ruler or caliper. Pellet size can also be measured by sieving pellets through a mesh or screen of a known dimension using, for example, ASTM method D1921. When referring to a mixture of polymer solids of varying sizes, the mixture should be considered to be made of pellets if at least 90% of the mixture is retained on a 10 mesh (2.0 mm) screen, while powder will not be retained to the same extent. Thermoplastic polymer pellets will have a high bulk density that is greater than that of powder. In some instances, the pellet bulk density will be from 0.50 to 0.90 grams per cubic centimeter (g/cc). Bulk density can be measured in any of various methods known in the art for example ASTM D1895 test methods B and C. The pellet(s) can be of any shape or form. For example, the pellets can be in the shape of cylinders, cubes, hemispheres, ovoids, chunks, rectangles, pyramids, parallelograms or irregular angular shapes. In some instances, the pellets will be cylinders that are on average 2 mm to 6 mm long and 0.5 mm to 4 mm in diameter. In other instances, the pellets can be made from regrind sheet or reground molded parts (including post consumer reground sheet and parts) with a largest dimension of 10 mm. In some instances it can be beneficial to mix small and large pellets together. In yet other instances it can be beneficial to have pellets with at least one sharp angular face, for example cubes and cylinders, rather than spheres or ovoids. In another instance the purge material will have at least one angular face wherein the surfaces defining the angular face meet at an angle of 60 to 120 degrees. In other instances the material will have an angular face wherein the surfaces meet at an angle of 80 to 100 degrees. To be most effective, the pellet should have a higher viscosity than the resin previously run on the extruder; desirably the pellet retains at least 70% of that higher initial viscosity during the purge process.

In some embodiments, the polymeric resin used for the purge pellets is the same as at least one component of the polymeric resin or resin mixture that was previously extruded or molded (and is being purged from the mixing device). For example, ULTEM™ 1000 PEI can be used to purge PEI, PEI-PET, or PEI-polycarbonate. A blend with at least 60 wt % poly(p-phenylene ether) (PPE) can be used to purge NORYL™ PPO resin, NORYL™ GTX (Nylon PPE) blends, as well as polystyrene or an ABS blend including at least 30 wt % butadiene rubber can be used as the purge pellet for ABS, ASA or SAN resins.

The thermoplastic polymeric resin pellets can be a homopolymer or copolymer. In other instances the resin pellets can be a mixture of two or more polymers, and in yet other instances can contain one or more rubbery impact modifiers.

The thermoplastic pellet can be in some instances condensation polymers made by the reaction of two or more monomers to form a polymer or copolymer with the elimination of water or an alcohol. Examples of condensation polymers are: polyesters, polyamides, polyimides, polyetherimides, polyphenylene ethers, liquid crystalline polymers In other instances the pellet will be an amorphous polymer, for example, polyphenylene ethers (PPE), polystyrenes, styrene acrylonitriles (SAN), acrylonitrile butadiene styrenes (ABS), polyetherimides (PEI), polysulfones (PSu), polyether sulfones (PES), polyphenylene ether sulfones (PPSU), polyurethanes, amorphous polyesters, and mixtures thereof. In yet other instances the amorphous polymer will have a glass transition temperature (Tg), measured by differential scanning calorimetry (DSC) as per ASTM D3418, from 110° C. to 280° C.

Examples of polyphenylene ether resins are described in U.S. Pat. Nos. 5,719,233; 5,723,539; and 8,029,717. Examples of acrylonitrile butadiene styrene (ABS) resins are described in U.S. Pat. Nos. 6,545,089 and 6,605,659. Examples of polyetherimide resins are described in U.S. Pat. Nos. 3,803,085; 3,905,942; and 7,041,773. Examples of polyphenylene sulfone resins are described in U.S. Pat. Nos. 4,176,222 and 8,034,857. Other thermoplastic resins are described for example in U.S. Pat. Nos. 7,300,742; 4,894,416; and 8,119,761.

In more specific embodiments, the amorphous thermoplastic resin can have a weight average molecular weight (Mw) of from 15,000 to 100,000 daltons (Da), according to polystyrene standards, including a range of from 30,000 to 80,000 daltons. Molecular weight can be measured by gel permeation chromatography (GPC) for example as in ASTM method D5296. The thermoplastic resins can be linear or branched polymers.

In other instances, the resin pellets can be made from a crystalline resin with a meting point (Tm), as determined by differential scanning calorimetry with a heating rate of 20° C./minute as described above, of from 110 to 320° C. Example of crystalline thermoplastic resin pellets are: polyamides, polyacetals, polyesters, liquid crystalline polyesters, polypropylenes, polyethylenes, polyolefins, polyvinyl chlorides, polyphenylene sulfides, polyether ether ketones, polyketones, and mixtures thereof. The crystalline polymers can comprise linear and branched resin as well as homopolymers and copolymers. In addition, the crystalline thermoplastic resins can be blended with non-crystalline resins.

In more specific embodiments, the crystalline thermoplastic resin (from which the pellets are made) can have a weight average molecular weight (Mw) of from 15,000 to 100,000 daltons, according to polystyrene standards, including a range of from 30,000 to 80,000 daltons. Molecular weight can be measured by gel permeation chromatography (GPC), for example as in ASTM method D5296.

The pellets used in the aqueous surfactant salt coated purge can have a melt viscosity, as measured by ASTM method D1238, from 10 to 100% higher than the melt viscosity of the resin that is being purged from the equipment to be cleaned. In other instances the purge pellets will have a weight average molecular weight (Mw) at least 10% higher than the Mw of the resin that is being purged from the equipment to be cleaned. Molecular weight can be measured by gel permeation chromatography (GPC) for example as in ASTM method D5296 using polystyrene standards.

The uncoated thermoplastic resin pellets will have a Rockwell R hardness, as measured by ASTM method D785-08, of from 85 to 140. In other instances, the hardness will be from 100 to 130, and in yet other instances the Rockwell R hardness will be from 110 to 125. It is believed that before melting a hard pellet is better able to scrape debris and deposits off the melt processing equipment than softer materials. While not being restricted to any specific mechanism or mode of action, it is believed that the external aqueous soap coating allows the hard solid pellets to travel further down the extruder, allowing a scraping action to occur in areas where the uncoated pellets, powder or other ingredients in the previously extruded mixture have largely melted and stuck to the metal screw and barrel. The hard pellets facilitate removal of such debris, deposits and black specks. The higher viscosity purge is useful in quickly conveying such debris from the equipment.

As previously explained above, in some instances the cleaning mixture comprises a surfactant salt (sulfonate salts, alkyl aryl sulfonate salts, alkyl sulfate salts or C6 to C36 carboxylic acid salts), the polymeric resin pellets, and water. In some instances the cleaning mixture contains from 70 wt % to 99.5 wt % of thermoplastic resin pellets with 0.5 to 30 wt % of a water solution comprising 10 to 40 wt % of at least one surfactant salt. Thus in some instances when a 10 wt % surfactant salt solution is used the cleaning mixture can comprise 99.5 wt % thermoplastic pellets, 0.05 wt % surfactant salt and 0.45 wt % water (a 99.5 wt % thermoplastic pellet mixture with 0.5 wt % of a 10 wt % surfactant salt solution in water). When a 10 wt % aqueous surfactant salt solution is used with 70 wt % thermoplastic pellets the cleaning mixture can comprise 70 wt % pellets, 3 wt % sulfonate salt and 27 wt % water. When the cleaning mixture comprises a 40 wt % surfactant salt solution the cleaning mixture with 99.5 wt % thermoplastic pellets the cleaning mixture can comprise 99.5 wt % pellets, 0.2 wt % surfactant salt and 0.3 wt % water. In instances where a 40 wt % aqueous surfactant salt solution is used in the cleaning mixture with 70 wt % thermoplastic pellets the cleaning mixture can comprise 70 wt % pellets, 12 wt % surfactant salt and 18 wt % water. Thus in some instances the cleaning mixture composition using a 10 to 40 wt % aqueous surfactant salt solution, can vary from 99.5 to 70 wt % thermoplastic pellets, 0.05 to 12 wt % surfactant salt and 0.3 to 27 wt % water. In yet other instances using a 20 to 30 wt % surfactant salt aqueous solution, the cleaning mixture composition can vary from 99 to 90 wt % thermoplastic pellets, 0.2 to 3 wt % surfactant salt and 0.7 to 8 wt % water.

It should be noted that the cleaning mixture (purge) can either be formed outside of the mixing device or within the mixing device. For example, in some embodiments, the polymer resin is added to the mixing device in the form of pellets. The salt can be separately added to the mixing device near or at the throat of the extruder, as an aqueous solution. In other instances, the cleaning mixture is formed outside of the mixing device and is fed directly into the feed throat of the mixing device. It is important that the pellets be externally coated with the aqueous salt/soap solution.

In the instance wherein the purge mixture is formed outside of the extruder, the polymeric resin pellets can be blended with the aqueous surfactant salt solution in any conventional mixing device. For example, paint shakers, vee-blenders, tumbler blends, such as drum tumblers, ribbon blenders, plowshare mixers, paddle mixers, double cone blenders, vertical cone screw blenders, static mixers, high intensity non fluxing mixers, such as a Henschel mixer or the like can be used to form the purge mixture. The polymeric resin pellets should be uniformly coated on all sides with the surfactant salt solution. In some specific instances, the polymeric resin pellet content will be from 70 wt % to 98 wt % of the purge mixture, and the surfactant salt solution will be from 2 wt % to 30 wt % of the purge mixture. In other embodiments, the polymeric resin pellet content is from 80 wt % to 98 wt % and the surfactant salt solution is from 2 wt % to 20 wt % of the purge mixture.

The use of an aqueous sulfonate salt, alkyl aryl sulfonate salt, alkyl sulfate salt, or C6 to C36 carboxylic acid salt solution enhances the effectiveness of the purge while providing the advantage of using an inflammable solvent in the hot melt processing equipment. The water used in preparing the liquid soap solution is a safe and environmentally benign solvent.

The cleaning mixture is used to clean or purge mixing devices that can contain a first resin, prior to the device being used to make a second, different resin. For example, the mixing device can have first been used to make a polymer of a first color, and is now being switched to make a polymer of a second, different color. Any polymeric residue in the mixing device that has the first color can contaminate the polymer having the second color.

The mixing device is contacted with the cleaning mixture (purge). The cleaning mixture is then run through the mixing device to remove the polymeric residue. Generally, the mixing device is heated to a temperature of from 200° C. to 380° C. (such as from 250° C. to 350° C.) while the cleaning mixture is being run. The mixing device can be operated at a speed of 50 to 300 rpm during the cleaning. In specific embodiments, the mixing device is heated to a temperature of from 220° C. to 380° C. and is operated at a speed of 50 to 100 rpm during the purging/cleaning.

In some instances the mixing device is run with the purge mixture for 1 to 20 minutes (min), or in other instances from 5 to 15 minutes. If desired, the cleaning run using the cleaning mixture can be followed by running a clean out resin through the mixing device. The clean out resin contains a polymeric resin with no sulfonate, alkyl aryl sulfonate, alkyl sulfate or C6 to C36 carboxylic acid salt additive. The cleaning mixture is then run with the clean out resin until free of contaminants (e.g. colorants, etc.). The clean out resin can be of any size, shape and source, for example powder, pellet, chunks, regrind, or any mixture thereof. The liquid purge mixture containing polymeric resin pellets and the salt additive effects clean out of the extruders in a short time and achieves this clean out with no significant decomposition of the purge polymeric resin. This allows the purge resin to be recycled.

It was previously considered that four different combinations of thermoplastic polymer with salt additive could be made: (1) the salt solution coated on polymeric pellets, (2) the salt solution coated on polymer powder, (3) solid salt powder on polymeric pellets; and (4) solid salt powder on polymer powder. However, the combination of aqueous salt solution coated on polymeric pellets [combination (1)] was surprisingly more effective than the other options as a purge or cleaning compound for screw driven melt processing equipment. The liquid mixture, particularly at a pH of 6.0 to 7.9, gives much faster removal of previously extruded resin residues and contaminants than the other three options listed above. A relatively thicker aqueous salt solution coated onto pellets can also be as effective as an aqueous solution. However, the aqueous salt solution should not be too viscous, which can hinder mixing with the pellets. Desirably, the aqueous salt solution has a viscosity at 23° C. of 20 to 1000 centipoise as measured by ASTM method D445.

This process of quickly purging polymer blends without causing resin degradation is especially useful in changing over melt processing equipment from one color to another. Colorants that can be purged in the processes of the present disclosure include: Solvent Green 3, Solvent Green 28, Solvent Green 38, Pigment Green 50, Pigment Green 36, Solvent Red 52, Solvent Red 101, Solvent Red 111, Solvent Red 135, Solvent Red 169, Solvent Red 179, Solvent Red 207, Pigment Red 101, Disperse Red 22, Vat Red 41, Solvent Orange 60, Solvent Orange 63, Disperse Orange 47, Solvent Violet 13, Solvent Violet 14, Solvent Violet 36, Solvent Violet 50, Disperse violet 26/31, Pigment Blue 29, Pigment Blue 60, Copper Phthalocyanine Pigment Blue 15.4, Disperse Blue 73, Solvent Blue 97, Solvent Blue 101, Solvent Blue 104, Solvent Blue 122, Solvent Blue 138, Pigment Yellow 53, Pigment Yellow 138, Pigment Yellow 139, Disperse Yellow 201, Solvent Yellow 33, Solvent Yellow 114, Solvent Yellow 93, Solvent Yellow 98, Solvent Yellow 163, Solvent Yellow 160:1, Solvent Yellow 188, Pigment Brown 24, Amino Ketone Black, chrome oxides, carbon black, channel black, pigment black 6, zinc sulfide, zinc oxide, titanium dioxide ($TiO_2$), and mixtures thereof. Colorants having a high affinity for metal surfaces such as phthalocyanine and anthraquinone based pigments and dyes, carbon black, channel black and mixtures thereof can also be removed.

In some instances the $TiO_2$ colorant will be encapsulated by an inorganic shell comprising silica, alumina, silica alumina, or a mixture thereof. In other instances the inorganic shell is further passivated with a silicon compound, for example a silane (Si—H functionality) or an alkoxy silane compound or a mixture thereof. The $TiO_2$ can have a particle size from 0.05 to 10 micrometers. In other instances the $TiO_2$ particle size will be from 0.1 to 1.0 micrometers.

The polymeric resin pellet(s) that is part of the cleaning mixture is run through the mixing device as part of the cleaning process. Upon exiting the device, this polymeric resin can be referred to as "purged" resin. This purged resin can be recovered for other uses or recycled.

In some embodiments, the initial polymeric resin pellet(s) used in the cleaning mixture is made from a thermoplastic resin that has an initial Mw of from 15,000 to 100,000 daltons as determined by ASTM D5296 using polystyrene calibration standards. In other instances, the initial polymer Mw will be from 30,000 to 80,000 daltons. In embodiments, the purged thermoplastic resin will have a weight average molecular weight (Mw) that is within 30% of the Mw of the polymer resin pellets (pre-purging). Put another way, the Mw of the purged resin is at least 70% of the Mw of the initial thermoplastic resin pellet(s) that was used in the cleaning mixture. In some instance the purged resin can also have a halogen content of 100 ppm or less.

Halogen content, specifically bromine and chlorine content, can be determined by various methods known in the art, such as for example combustion analyses, mass spectroscopy, atomic emission spectroscopy, atomic absorption, inductively coupled plasma (ICP) and X-ray methods, such as x-ray fluorescence (XRF). Examples of such methods are ASTM methods D808, D6247 and D6349.

In a more detailed description, the purge operation is typically conducted by carrying out the following steps. The extrusion production by the extruder is stopped, i.e. the resin feed to the extruder is stopped and the extruder screw is run until the extruder seems empty of the preceding resin (which can be a polycarbonate or other polycarbonate containing polymeric resin). The extruder nozzle (extrusion head) which contains the extrusion die and breaker plate, if any, may not need to be removed from the extruder. The temperature of the extruder can generally be maintained at the high operating temperature. The liquid cleaning mixture comprising polymeric resin pellets and alkyl aryl sulfonate salt can be fed into the feed hopper and screw inlet. The screw is operated to feed and compact the cleaning mixture as it traverses the length of the extruder barrel, in some instances practically forming a plug flow of the cleaning mixture as it exits the extruder, removing any polymeric residue (contaminants such as colorant residue, degraded resins, gels and black specks, carbon) and carrying this along with the exiting purged resin. The amount of cleaning mixture needed can be judged visually by the absence of contaminant and residue from the extruder. The purge compound can normally be followed with a clean out resin to convey all contaminants from the extruder. The subsequent polymer can then be processed through the mixing device.

In some instances aqueous surfactant salt solution (with no pellets) is added to melt processing equipment, often a single or twin screw extruder, followed by pellets coated with from 0.5 to 10 wt % of the aqueous surfactant salt solution and the extruder is run at 50 to 300 rpm to effect efficient cleaning. In yet other instances surfactant solution is added an extruder at 25 to 150 rpm followed by pellets coated with from 0.5 to 10 wt % of the aqueous surfactant solution and the extruder is run at 150 to 500 rpm.

In some instances the melt convening equipment, for example a compounding extruder, can have more than one feeding inlet. In certain instances said inlets are located in the first third of the extruder furthest from the exit die. In these situations in order to get more efficient cleaning it is advantageous for the inlet (or inlets) closer to the exit die to be plugged or otherwise closed when the aryl sulfonate surfactant coated pellets are fed into the inlet furthest from the exit die. In other instances with extruders having multiple feed inlets (ports) within the ⅓ of the extruder screw furthest from the die, coated pellets can be added to the feed zone closet to the die when plugs are not available, In yet other instances the coated pellet purge can be advantageously added to the feed inlet (feed port) where the colorants are added. Any inlet downstream (closer to the die) and still in the dry feeding/conveying section of the extruder screw (usually the first ⅓ of the extruder screw) furthest from the die can be plugged to prevent excessive foaming of the purge out of the nearby feed port. Vents in the extruder within the portion of the screw closest to the die, where a polymer melt has been established, usually do not need to be plugged. Note that plugging is an optional best practice, the extruder can be purged with no plugs in place. Foaming is only an inconvenience making the liquid coated pellet purge less efficient.

In yet another version of the purging (cleaning) process for melt conveying equipment a first portion of aqueous surfactant salt coated pellets are fed into the extruder and run at a slower rate of 25 to 150 rpm followed by a second portion of aqueous surfactant salt coated pellets are fed into the extruder and run at a faster rate of 150 to 500 rpm. In some instances the coated pellets will comprise 1 to 10 wt % of an aqueous surfactant salt solution having a pH of 6.0 to 7.9, a concentration from 10 to 40 wt % of alkyl aryl sulfonate salt, the aqueous solution having a viscosity at 23° C. of 20 to 1000 centipoise, as measured by ASTM method D445.

In other instances the melt processing equipment can be purged (cleaned) using a first portion of an aqueous surfactant salt solution as described above with no resin pellets, followed by a second portion of purge wherein the sulfonate salt solution is coated onto the thermoplastic resin pellet. In some instances the coated pellets will comprise 1 to 10 wt % of an aqueous surfactant salt solution having a pH of 6.0 to 7.9, a concentration from 10 to 40 wt % of surfactant salt, the aqueous solution having a viscosity at 23° C. of 20 to 1000 centipoise, as measured by ASTM method D445.

In some instances, for example with a single screw extruder, or injection molding machine using a single screw for melt conveying, if the coated pellet purge is too wet (too slippery), the coated purge pellets can tend to windmill (spin in the feed zone without being carried down the barrel by the screw). In other instances there can also be excessive foaming. These situations occur more often in single screw extruders when the pellet purge is prepared with greater than 10 wt % of the surfactant salt solution. In these instances the pellet purge may not efficiently be conveyed by the single screw extruder of the molding machine. It was surprisingly found that a low level 0.2 to 5 wt %, specifically, 0.5 to 5 wt %, more specifically, 1 to 3 wt %, of aqueous surfactant salt solution coating the pellets was most effective in single screw extruders. Likewise, for use in a single screw extruder, a 20% sulfonate salt solution comprising only 0.2 to 0.6 wt % of alkyl aryl sulfonate salt can be present in the cleaning mixture. It is very surprising that such a very low level of surfactant salt in combination with thermoplastic pellet can be so effective in improving the cleaning of melt processing equipment.

While not being constrained by any mechanism or mode of action, it is believed that the salt solution coated pellets can slide down the extruder screw further than other types of cleaning materials to reach the transition region of the melt processing equipment where most often there is the highest level of deposit. The pellets are not completely melted but are in a solid or semi solid or partially melted form allowing a scouring action. The surfactant salt solution allows further cleansing and lifting of colorants from metal surfaces, but with proper purity and pH does not cause degradation (loss of molecular weight) of the polymeric resin pellets. Loss of polymer molecular weight reduces the melt viscosity and impedes cleaning and conveying to remove the contaminants from the machine screw and barrel.

The processes of the present disclosure are useful for preventing or reducing degradation of polymers that are subsequently processed in the mixing device. The processes are also useful for polymer blends, for instance those containing rubbery modifiers such as MBS and ABS and vinyl addition polymers such as SAN. Exemplary rubber modifiers are methacrylate butadiene styrene (MBS), butadiene grafted with SAN, styrene butadiene block copolymers (SBS) hydrogenated styrene butadiene block copolymers (SEBS) as well as acrylic rubber, and acrylate styrene acrylonitrile (ASA) rubber. In yet other instances, the polymer containing blend can also comprise mixtures with thermoplastic polyesters such as PET (polyethylene terephthalate), PBT (polybutylene terephthalate), (polypropylene terephthalate) (PPT), PCT (polycyclohexane dimethanol terephthalate), PEN (polyethylene naphthanoate) and PLA (polylactic acid) combinations comprising at least one of the foregoing polyesters. The polyester blends can further comprise rubbery modifiers such as MBS, ABS or mixtures thereof.

The cleaning mixture (alkyl aryl sulfonate salt liquid or solution and polymeric resin pellet) and clean out can be used after any colored resin or resin mixture containing polymer to clean a mixing device. The cleaning mixture and clean out can also be used after a change in molecular species, for example cleaning out a brominated, chlorinated or phosphate-containing polymer or copolymer or mixture containing a brominated, chlorinated or phosphate additive prior to running a subsequent polymer through the mixing device. For example, the cleaning mixture can be used to clean a mixing device after extruding a brominated flame retardant or a blend with a triaryl phosphate.

The cleaning mixtures of the present disclosure offer some advantages over commonly used high pH (greater than 9.0) liquid detergents. Less resin is needed to purge the mixing device. The resin that is used for the purging process is less degraded, and so can be recovered or recycled for other uses. The mixing device can be run at a higher rate of extrusion. Clean up and change over takes less time, and most often can be accomplished without dismantling the equipment and removing the screw. This permits the mixing device, which represents a large capital investment, to be more available for manufacturing and production. The temperature of the mixing device is also retained and there is no foaming of the extrudate.

By having the more efficient purging operations described herein there is less need to pull (remove) the melt conveying screw from the processing equipment, this not only saves time (making for a more efficient manufacturing operation) but reduces possible damage to the equipment during the screw pull. Also reduced screw pulls improves safety by reducing operator exposure to molten plastic, and possible fumes generated therefrom, during the removal and subsequent cleaning of the screw.

Set forth below are some examples of embodiments of the disclosed process and cleaning mixture.

Embodiment 1 A process to clean melt processing equipment, e.g., used to compound, mold, and/or extrude resins containing a polymer, comprising: purging the melt processing equipment with a cleaning mixture (purge) and running the melt processing equipment at a temperature of from 200 to 380° C. to obtain a purged resin while cleaning the melt processing equipment. The cleaning mixture (purge) comprises: from 70 to 99 wt % of thermoplastic polymeric resin pellets, the pellets having a Rockwell R hardness of from 85 to 140 as measured by ASTM D785; and from 1 to 30 wt % of an aqueous solution that contains 0.2 to 30 wt % of a surfactant salt selected from at least one of the following: sulfonate salts, alkyl aryl sulfonate salts, alkyl sulfate salts, C6 to C36 carboxylic acid salts, and mixtures thereof, wherein the aqueous solution has a pH of 6.0 to 9.0.

Embodiment 2: The process of Embodiment 1, wherein the surfactant salt is present in the solution at an amount of 5 to 30 wt % of the solution.

Embodiment 3: The process of Embodiment 1, wherein the surfactant salt is present in the solution at 0.1 wt % to 9 wt % of the solution.

Embodiment 4: The process of Embodiment 3, wherein the surfactant salt is present in the solution at 0.2 to 5 wt % (or 0.5 to 5 wt %) of the solution.

Embodiment 5: The process of any of Embodiments 1-4, wherein the melt processing equipment is run for a period of from 1 minute to 20 minutes to obtain the purged resin.

Embodiment 6: The process of any of any of Embodiments 1-5, wherein the aqueous solution has a pH of 6.0 to 7.0.

Embodiment 7: The process of any of Embodiments 1-6, wherein the surfactant salt contains an alkali metal cation selected from at least one of the following: sodium, potassium, and mixtures thereof.

Embodiment 8: The process of any of Embodiments 1-7, wherein the aqueous solution has a viscosity of 20 to 1000 centipoise as measured by ASTM D445 at 23° C.

Embodiment 9: The process of any of Embodiments 1-8, wherein the surfactant salt is an alkyl aryl sulfonate salt having at least one of the following structures:

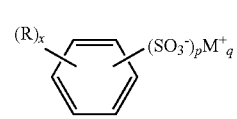

Formula (B)

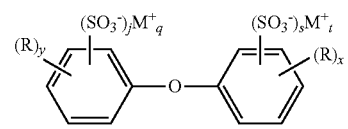

Formula (E)

wherein each M is an alkali metal cation; each R is independently alkyl having from 1 to 36 carbon atoms; x is 1 to 5; y is 0 to 5; p is 1 to 3; q is 1 to 3; s is 0 to 3; and t is 0 to 3.

Embodiment 10: The process of Embodiment 9, wherein y is 1 to 5, and/or s is 1 to 3, and/or t is 1 to 3.

Embodiment 11: The process of any of Embodiments 9-10, wherein x=1 and y=1.

Embodiment 12: The process of Embodiment 9, wherein the alkyl aryl sulfonate salt is an alkyl benzene sulfonate salt.

Embodiment 13: The process of Embodiment 9, wherein Formula B has the following structure:

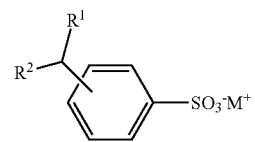

Formula (F)

where M is an alkali metal cation; $R^1$ is an alkyl group containing from 5 to 35 carbon atoms; and $R^2$ is hydrogen or an alkyl group containing from 1 to 12 carbon atoms, with $R^1$ and $R^2$ having no more than 36 total carbon atoms.

Embodiment 14: The process of any of Embodiments 1-8, wherein the surfactant salt is a carboxylic acid salt of Formula (G):

R—COO⁻M⁺                    Formula (G)

wherein R is alkyl having from 6 to 36 carbon atoms; and M is an alkali metal cation.

Embodiment 15: The process of any of Embodiments 1-8, wherein the surfactant salt is an alkyl sulfate salt of Formula (H):

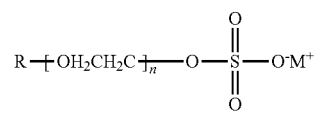

Formula (H)

wherein R is alkyl having from 6 to 36 carbon atoms; M is an alkali metal cation; and n is from 0 to 4.

Embodiment 16: The process of Embodiment 15, wherein n is 1 to 4

Embodiment 17: The process of any of Embodiments 1-16, wherein the surfactant salt has less than 10% loss of initial dry weight when measured by thermal gravimetric analysis (TGA) at 250° C., under nitrogen, with a 20° C./minute heating rate.

Embodiment 18: The process of any of Embodiments 1-17, wherein the thermoplastic polymeric resin pellets comprise cylinders with an average length of 2.0 to 6.0 mm and an average diameter of 0.5 to 4.0 mm.

Embodiment 19: The process of any of Embodiments 1-18, wherein the thermoplastic polymeric resin pellets have a bulk density of 0.5 to 0.9 g/cc as measured by ASTM D1895.

Embodiment 20: The process of any of Embodiments 1-19, wherein the thermoplastic polymeric resin pellets have at least one angular face and wherein the surfaces defining the angular face meet at an angle of 60 to 120 degrees.

Embodiment 21: The process of any of Embodiments 1-20, wherein the polycarbonate resin pellets have at least one angular face and wherein the surfaces defining the angular face meet at an angle of 80 to 100 degrees Embodiment 22: The process of any of Embodiments 1-21, wherein the thermoplastic polymeric resin pellets comprise a condensation polymer.

Embodiment 23: The process of any of Embodiments 1-22, wherein the thermoplastic polymeric resin pellets comprise an amorphous polymer that has a glass transition temperature (Tg) from 110 to 280° C., as measured by ASTM D3418.

Embodiment 24: The process of any of Embodiments 1-23, wherein the thermoplastic polymeric resin pellets comprise at least one of the following: polyphenylene ethers, polystyrenes, styrene acrylonitriles, acrylonitrile butadiene styrenes, polyetherimides, polysulfones, polyether sulfones, polyphenylene ether sulfones, polyurethanes, amorphous polyesters, and mixtures thereof.

Embodiment 25: The process of any of Embodiments 1-24, wherein the thermoplastic polymeric resin pellets comprise a crystalline polymer that has a melting point temperature (Tm) from 110 to 320° C.

Embodiment 26: The process of any of Embodiments 1-25, wherein the thermoplastic polymeric resin pellets comprise at least one of the following: polyamides, polyacetals, polyesters, liquid crystalline polyesters, polypropylenes, polyethylenes, polyolefins, polyvinyl chlorides, polyphenylene sulfides, polyether ether ketones, polyketones, and mixtures thereof.

Embodiment 27

The process of any of Embodiments 1-26, wherein the thermoplastic polymeric resin pellets in the cleaning mixture have a weight average molecular weight (Mw) at least 10% higher than a polymer resin previously run in the melt processing equipment.

Embodiment 28: The process of any of Embodiments 1-27, wherein the thermoplastic polymeric resin pellets in the cleaning mixture have a weight average molecular weight (Mw) of 15,000 to 100,000 daltons measured according to polystyrene standards.

Embodiment 29: The process of any of Embodiments 1-28, wherein the thermoplastic polymeric resin pellets are the same resin as at least one polymeric component of the resin previously processed in the melt processing equipment being cleaned.

Embodiment 30: The process of any of Embodiments 1-29, wherein the melt processing equipment is an extruder with a length to diameter (L/D) ratio from 20:1 to 40:1 and has a screw diameter of 0.5 to 8.0 inches, and is run at a speed of 50 to 100 rpm at a temperature of 200 to 380° C.

Embodiment 31: The process of any of Embodiments 1-30, wherein the mixing device has a single screw for melt conveying.

Embodiment 32: The process of Embodiment 31, wherein the mixing device is a single screw extruder having a screw diameter from 0.5 to 8.0 inches (1.27 centimeters (cm)-20.32 cm) that is part of a thermoplastic molding machine.

Embodiment 33: The process of any of Embodiments 31-32, wherein the single screw for melt conveying is part of a molding machine selected from at least one of the following: injection molding machines, blow molding machines, injection-blow molding machines, extrusion-blow molding machines, stretch-blow molding machines, gas assist molding machines, hydraulic molding machines, mechanical molding machines and electric molding machines.

Embodiment 34: The process of any of Embodiments 1-33, wherein the melt processing equipment is contaminated with a colorant selected from at least one of the following: Solvent Green 3, Solvent Green 28, Solvent Green 38, Pigment Green 50, Pigment Green 36, Solvent Red 52, Solvent Red 101, Solvent Red 111, Solvent Red 135, Solvent Red 169, Solvent Red 179, Solvent Red 207, Pigment Red 101, Disperse Red 22, Vat Red 41, Solvent Orange 60, Solvent Orange 63, Disperse Orange 47, Solvent Violet 13, Solvent Violet 14, Solvent Violet 36, Solvent Violet 50, Disperse Violet 26/31, Pigment Blue 29, Pigment Blue 60, Copper Phthalocyanine Pigment Blue 15.4, Disperse Blue 73, Solvent Blue 97, Solvent Blue 101, Solvent Blue 104, Solvent Blue 122, Solvent Blue 138, Pigment Yellow 53, Pigment Yellow 138, Pigment Yellow 139, Disperse Yellow 201, Solvent Yellow 33, Solvent Yellow 114, Solvent Yellow 93, Solvent Yellow 98, Solvent Yellow 163, Solvent Yellow 160:1, Solvent Yellow 188, Pigment Brown 24, Amino Ketone Black, chrome oxides, carbon black, channel black, titanium dioxide, Pigment Black 6, zinc oxide, zinc sulfide, and mixtures thereof.

Embodiment 35: The process of Embodiment 34, wherein the colorant comprises the titanium dioxide and the titanium dioxide is encapsulated with a silica, alumina or silica-alumina shell and has a particle size of 0.1 to 1.0 micrometers.

Embodiment 36: The process of any of Embodiments 1-35, wherein the cleaning mixture has 100 ppm or less of at least one of the following: ammonium salts, amines, amino acids, carbonate salts, bicarbonate salts, formaldehyde, poly formaldehyde, or formalin.

Embodiment 37: The process of any of Embodiments 1-36, wherein the cleaning mixture contains less than 5% of a flammable liquid selected from at least one of the following: ethanol and methanol.

Embodiment 38: The process of any of Embodiments 1-37, wherein the aqueous surfactant salt solution is added to melt processing equipment followed by thermoplastic polymeric pellets coated with from 0.5 to 10% of the aqueous surfactant salt solution and the extruder is run at 50 to 500 rpm.

Embodiment 39: The process of any of Embodiments 1-38, wherein the aqueous surfactant salt solution is added to the melt processing equipment at 25 to 150 rpm followed by pellets coated with from 0.5 to 10% of the aqueous surfactant solution and the extruder is run at 150 to 300 rpm.

Embodiment 40: The process of any of Embodiments 1-39, wherein the melt processing equipment has more than one feeding inlet and the inlets are located in the first third of the extruder furthest from the exit die, wherein the inlets closest to the exit die are pugged or otherwise closed when the aqueous surfactant salt coated pellets are fed into the inlet furthest from the exit die.

Embodiment 41: The process of any of Embodiments 1-40, wherein the melt processing equipment has more than one feeding inlet and wherein the aqueous surfactant solution coated thermoplastic polymeric pellets are fed into at least one feed inlet wherein at least one colorant is added.

Embodiment 42: The process of any of Embodiments 1-41, further comprising: feeding a first portion of aqueous surfactant salt coated thermoplastic pellets into the melt processing equipment, wherein the melt processing equipment is run at a rate of 25 to 150 rpm; and feeding a second portion of aqueous surfactant salt coated thermoplastic pellets into the melt processing equipment, wherein the melt processing equipment is run at rate of 150 to 500 rpm. The coated pellets comprise 1 to 10 wt % of the aqueous surfactant salt solution having a pH of 6.0 to 7.9, a concentration from 10 to 40 wt % of surfactant salt, the aqueous solution having a viscosity at 23° C. of 20 to 1000 centipoise, as measured by ASTM method D445.

Embodiment 43: A cleaning mixture, comprising: water; thermoplastic polymeric resin pellets having a Rockwell R hardness of from 85 to 140 as measured by ASTM D785; and a surfactant salt selected from at least one of the following: sulfonate salts, alkyl aryl sulfonate salts, alkyl sulfate salts, C6 to C36 carboxylic acid salts, and mixtures thereof; wherein the cleaning mixture has a pH from 6.0 to 9.0.

Embodiment 44: The cleaning mixture of Embodiment 1, wherein the surfactant salt is present in the solution at an amount of 5 to 30 wt % of the cleaning mixture.

Embodiment 44: The cleaning mixture of Embodiment 43, wherein the surfactant salt is 0.1 wt % to 9 wt % of the cleaning mixture.

Embodiment 45: The cleaning mixture of any of Embodiments 43-44, wherein the surfactant salt is present in the solution at 0.2 to 5 wt % of the cleaning mixture.

Embodiment 46: The cleaning mixture of any of Embodiments 43-45, wherein the surfactant salt is present in the solution at 0.5 to 5 wt % of the cleaning mixture.

Embodiment 47: The cleaning mixture of any of Embodiments 43-46, wherein the thermoplastic polymeric resin pellets are 70 to 99 wt % of the cleaning mixture.

Embodiment 48: The cleaning mixture of any of Embodiments 43-47, wherein the water is present in an amount of 0.9 to 12.0 wt % of the cleaning mixture.

Embodimen 49: The cleaning mixture of any of Embodiments 43-48, wherein the surfactant salt and the water form an aqueous solution with a pH of 6.0 to 7.0.

Embodimen 50: The cleaning mixture of any of Embodiments 43-49, wherein the surfactant salt and the water form an aqueous solution and the aqueous solution has a viscosity of 20 to 1000 centipoise as measured by ASTM D445 at 23° C.

Embodimen 51: The cleaning mixture of any of Embodiments 43-50, wherein the thermoplastic polymeric resin pellets comprise cylinders with an average length of 2.0 to 6.0 mm and an average diameter of 0.5 to 4.0 mm.

Embodimen 52: The cleaning mixture of any of Embodiments 43-51, wherein the thermoplastic polymeric resin pellets have a bulk density of 0.5 to 0.9 g/cc, as measured by ASTM D1895.

Embodimen 53: The cleaning mixture of any of Embodiments 43-52, wherein the thermoplastic polymeric resin pellets comprise pellets having at least one angular face and wherein the surfaces defining the angular face meet at an angle of 60 to 120 degrees.

Embodimen 54: The cleaning mixture of any of any of Embodiments 43-53, wherein the aqueous surfactant salt solution has a pH of 6.0 to 7.0.

Embodimen 55: The cleaning mixture of any of Embodiments 43-54, wherein the surfactant salt contains an alkali metal cation selected from at least one of the following: sodium, potassium, and mixtures thereof.

Embodimen 56: The cleaning mixture of any of Embodiments 43-55, wherein the aqueous surfactant salt solution has a viscosity of 20 to 1000 centipoise as measured by ASTM D445 at 23° C.

Embodimen 57: The cleaning mixture of any of Embodiments 43-56, wherein the surfactant salt is an alkyl aryl sulfonate salt having at least one of the following structures:

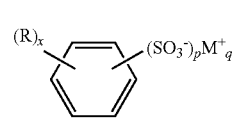

Formula (B)

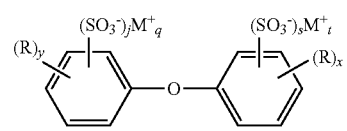

Formula (E)

wherein each M is an alkali metal cation; each R is independently alkyl having from 1 to 36 carbon atoms; x is 1 to 5; y is 0 to 5; p is 1 to 3; q is 1 to 3; s is 0 to 3; and t is 0 to 3.

Embodimen 58: The cleaning mixture of Embodiment 57, wherein y is 1 to 5, and/or s is 1 to 3, and/or t is 1 to 3.

Embodimen 59: The cleaning mixture of any of Embodiments 57-58, wherein x=1 and y=1.

Embodimen 60: The cleaning mixture of Embodiment 57, wherein the alkyl aryl sulfonate salt is an alkyl benzene sulfonate salt.

Embodimen 61: The cleaning mixture of Embodiment 57, wherein Formula B has the following structure:

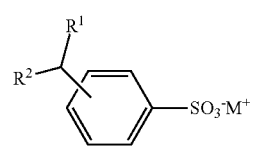

Formula (F)

where M is an alkali metal cation; $R^1$ is an alkyl group containing from 5 to 35 carbon atoms; and $R^2$ is hydrogen or an alkyl group containing from 1 to 12 carbon atoms, with $R^1$ and $R^2$ having no more than 36 total carbon atoms.

Embodimen 62: The cleaning mixture of any of Embodiments 43-56, wherein the surfactant salt is a carboxylic acid salt of Formula (G):

Formula (G)

wherein R is alkyl having from 6 to 36 carbon atoms; and M is an alkali metal cation.

Embodimen 63: The cleaning mixture of any of Embodiments 43-56, wherein the surfactant salt is an alkyl sulfate salt of Formula (H):

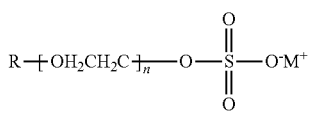

Formula (H)

wherein R is alkyl having from 6 to 36 carbon atoms; M is an alkali metal cation; and n is from 0 to 4.

Embodimen 64: The cleaning mixture of Embodiment 63, wherein n is 1 to 4.

Embodimen 65: The cleaning mixture of any of Embodiments 43-64, wherein the surfactant salt has less than 10% loss of initial dry weight when measured by thermal gravimetric analysis (TGA) at 250° C., under nitrogen, with a 20° C./minute heating rate.

Embodimen 66: The cleaning mixture of any of Embodiments 43-65, wherein the thermoplastic polymeric resin pellets comprise cylinders with an average length of 2.0 to 6.0 mm and an average diameter of 0.5 to 4.0 mm.

Embodimen 67: The cleaning mixture of any of Embodiments 43-66, wherein the thermoplastic polymeric resin pellets have a bulk density of 0.5 to 0.9 g/cc as measured by ASTM D1895.

Embodimen 68: The cleaning mixture of any of Embodiments 43-67, wherein the thermoplastic polymeric resin pellets have at least one angular face and wherein the surfaces defining the angular face meet at an angle of 60 to 120 degrees.

Embodimen 69: The cleaning mixture of any of Embodiments 43-68, wherein the polycarbonate resin pellets have at least one angular face and wherein the surfaces defining the angular face meet at an angle of 80 to 100 degrees Embodimen 70: The cleaning mixture of any of Embodiments 43-69, wherein the thermoplastic polymeric resin pellets comprise a condensation polymer.

Embodimen 71: The cleaning mixture of any of Embodiments 43-70, wherein the thermoplastic polymeric resin pellets comprise an amorphous polymer that has a glass transition temperature (Tg) from 110 to 280° C., as measured by ASTM D3418.

Embodimen 72: The cleaning mixture of any of Embodiments 43-71, wherein the thermoplastic polymeric resin pellets comprise at least one of the following: polyphenylene ethers, polystyrenes, styrene acrylonitriles, acrylonitrile butadiene styrenes, polyetherimides, polysulfones, polyether sulfones, polyphenylene ether sulfones, polyurethanes, amorphous polyesters, and mixtures thereof.

Embodimen 73: The cleaning mixture of any of Embodiments 43-72, wherein the thermoplastic polymeric resin pellets comprise a crystalline polymer that has a melting point temperature (Tm) from 110 to 320° C.

Embodimen 74: The cleaning mixture of any of Embodiments 43-73, wherein the thermoplastic polymeric resin pellets comprise at least one of the following: polyamides, polyacetals, polyesters, liquid crystalline polyesters, polypropylenes, polyethylenes, polyolefins, polyvinyl chlorides, polyphenylene sulfides, polyether ether ketones, polyketones, and mixtures thereof.

Embodimen 75: The cleaning mixture of any of Embodiments 43-74, wherein the thermoplastic polymeric resin pellets in the cleaning mixture have a weight average molecular weight (Mw) of 15,000 to 100,000 daltons measured according to polystyrene standards.

Embodimen 76: The cleaning mixture of any of Embodiments 43-75, wherein the pellets have at least one sharp angular face.

Embodimen 77: The cleaning mixture of any of Embodiments 43-76, wherein the pellets are other than spherical or ovoid.

Embodimen 78: The process of any of Embodiments 1-42, wherein the pellets have at least one sharp angular face.

Embodimen 79: The process of any of Embodiments 1-43 or 78, wherein the pellets have a shape are other than spherical or ovoid.

The following examples are provided to illustrate the processes of the present disclosure. The examples are merely illustrative and are not intended to limit the disclosure to the materials, conditions, or process parameters set forth therein. Examples of the invention are designated by number, comparative examples are noted by letter.

EXAMPLES

Comparative Example A

Ten kilograms (kg) of ULTEM™ 1010 polyetherimide (PEI) thermoplastic resin mixed with 2.5 wt % titanium dioxide powder, 0.013% solvent orange 60, 0.03% solvent yellow 33, 0.01% pigment brown 24 and 0.001% carbon black, was extruded on a 30 mm intermeshing co-rotating twin screw extruder at a temperature of 600 to 670 degrees Fahrenheit (° F.) (315 to 354° C.) and at a rate of about 300 rpm. The $TiO_2$ (CAS #13463-67-7) had an average particle size of 0.2 micrometer and had about 1.5 wt % of a silica alumina shell. The PEI had a Mw of 32,700 daltons. The extruder was run until empty (i.e. until there was no more resin left in the barrel) and the hopper and feeders were cleaned. The extruder was then run with about 50 pounds (lb) (23 kg) of ULTEM™ 1000 pellets and finely ground powder to purge the extruder. After about 2 hours, all of the white pigment and black specks were removed leaving clear PEI strands with no white pigment.

Example 1

After again running 10 kg of the PEI/titanium dioxide blend of Comparative Example A, cleaning the feeder and hopper and running the extruder until no more resin came out, the extruder was cleaned/purged using a mixture of 10 lb (4.5 kg) of ULTEM™ 1000 pellets uniformly coated with 2 lb (0.9 kg) of an aqueous solution including about 20 wt % sodium dodecyl benzene sulfonate (SDBS) (pH about 6.5). The pellets had an average size of about 3-6 mm by about 1-3 mm. The ULTEM™ 1000 pellets used for the purge had an initial Mw of 38,000 Da, about 20% greater than the ULTEM™ 1010 PEI mixed with the white pigment and a Rockwell R hardness (as measured by ASTM D785) of 125. The cylindrical pellets had a bulk density of 0.8 g/cc with an angular face from 80 to 100 degrees from the cylindrical body. There was less than 10% loss of the weight average molecular weight (Mw) of the PEI purge resin when run through the extruder. The coated pellets cleaned the extruder (i.e. the extruded strands showed no titanium dioxide residue) after only about 30 minutes using 80% less resin.

The coated pellets were also effective at purging out black specks not removed in the uncoated PEI pellet purge mixture. The SDBS aqueous sulfonate surfactant salt purge performed well at the high melt processing temperature with no fumes or decomposition. The aqueous SDBS PEI coated thermoplastic pellet purge mixture had the intermeshing twin screw extruder ready to run in less than a quarter of the time of Comparative Example A, resulting in a saving of resin and an improvement in machine usage.

Examples 2, 3, and Comparative Example B

A 180 ton (1.6×10$^5$ kg) Demag single screw hydraulic injection molding machine with a screw having a L/D of 20 and diameter of 35 mm was used to mold a polyetherimide (PEI) resin comprising the following ingredients: 97.07 wt % ULTEM 1010 polyetherimide, 0.1 wt % stearic acid, 2.0 wt % titanium dioxide (TiO$_2$), 0.7 wt % pigment yellow 138, 0.07 wt % solvent orange 60, 0.05 wt % solvent red 52 and 0.001 wt % carbon black. The TiO$_2$ had an average particle size of 0.25 micrometer and had 1.5 wt % of a silica shell.

The colored PEI resin was dried for 8 hours (hr) at 150° C. and ASTM test parts were molded at 340 to 365° C. using a 40 second (sec) cycle comprising of a 10 sec injection with a 12 sec hold time. Mold temp was 150° C. In Comparative Example B after the molding was finished the machine was run until no more resin left the barrel, the molding machine was then purged with (about 4 kg) a clear uncolored polyetherimide (Ultem 1010, Mw 33,000 Da). The dry uncolored PEI was run for 45 minutes to mold clear parts with no haze or residue from the previously run pigmented PEI material. The injection molding machine was judged clean and ready to run the next material.

In Example 2 after another set of parts were molded on the same machine using the same colored PEI material as described above with the same injection molding machine settings. The molding machine was purged with high Mw PEI (ULTEM 1000, Mw 38,000 Da) coated with 1 wt % of a 20 wt % aqueous sodium alkyl benzene sulfonate soap (pH of 6.5). The pellets were cylindrical with a diameter for about 2 to 3 mm and had a length of about 4 to 6 mm and a Rockwell R hardness (as measured by ASTM D785-85) of 125. The cut face of the pellets had an angle of from about 80 to 100 degrees. The pellets had a bulk density of about 0.8 g/cc before coating. After just 15 minutes 1000 grams (g) of alkyl benzene sulfonate surfactant salt coated PEI pellet purge was very effective in cleaning the molding machine removing the previously run colored material as well as black specks and gels that had built up on the screw. This was a 67% reduction in cleaning time of the molding machine and a 75% reduction in the amount of resin need to clean the injection molding machine.

In another experiment (Example 3) after the same molding machine, running the same colored PEI, was purged using the uncoated PEI (ULTEM 1010) pellets of Comparative Example B. The molding machine, judged to be "clean", was then run with 1000 g of the 1% aqueous alkyl benzene sulfonate surfactant salt coated PEI (ULTEM 1000) pellets. During the 15 min purge (cleaning) the coated pellet purge of the injection molding machine that had been judged "clean" by visual inspection of the molded parts, showed additional purging of black specks and other contaminants that had not been removed from the screw by the cleaning of Comparative Example B. The aqueous alkyl benzene sulfonate salt coated PEI pellet purge had removed contaminants that might have broken out later during subsequent molding cycles giving contaminated parts that would be rejected and scrapped.

Examples 4, 5, and Comparative Example C

Twenty kg of a polyphenylene ether (PPE) polystyrene resin (PS) thermoplastic blend comprising; 38.807 wt % polyphenylene ether (PPE), 58.0 wt % high impact polystyrene, containing 10.6 wt % butadiene rubber (HIPS3190), 0.9 wt % linear low density polyethylene (LLDPE), 0.05 wt % triaryl phosphite stabilizer, 0.08 wt % magnesium oxide, 0.08 wt % zinc sulfide and colorants comprising: 2.0 wt % titanium dioxide, 0.05 wt % pigment brown 24, 0.03 wt % pigment red 101 and 0.003 wt % pigment black 7 was extruded on a 30 mm intermeshing co-rotating twin screw extruder with a 30 L/D at a temperature of 270 to 300° C. at a rate of about 400 rpm. The TiO$_2$ (CAS #13463-67-7) had an average particle size of 0.25 micrometer and was encapsulated with about 1.5 wt % of a silica shell. The PPE powder had an intrinsic viscosity (IV) of 0.46 deciliters per gram (dl/gm). The extruder was run until empty (i.e. until there was no more resin that could be conveyed from the barrel) and the hopper and feeders were cleaned. In Comparative Example C the extruder was then run with about 5 kg. of high impact polystyrene pellets (HIPS3190) to purge the extruder. HIPS 3190 has butadiene content of 10.6 wt %. After about 1 hour the colorants and black specks were not completely removed and it was necessary to remove the screw from the extruder and clean it with wire brushing before the extruder was ready to run the next material.

In Example 4 after again running 20 kg of the same colored PPE-PS blend in the same extruder under the same conditions as above (Comparative Example C) and, cleaning the feeder and hopper and running the extruder until no more resin came out, the extruder was cleaned/purged using a mixture of 2000 g of thermoplastic NORYL™ PKN4752 pellets uniformly coated with 20 g of an aqueous surfactant solution of 20 wt % sodium dodecyl benzene sulfonate (SDBS). The solution had a pH of 6.5. The coated pellets cleaned the extruder (i.e. the extruded strands showed no colored residue) after only about 30 minutes, it was not necessary to remove the screw. Not only was the extruder brought to a higher level of cleanliness but was so with a 60% reduction in the amount of resin need to clean the extruder.

The NORYL PK4752 purge pellets comprised a mixture of 70 wt % PPE and 30 wt % polystyrene had a high MVR (melt viscosity) of 10 cc/10 min at 300° C. with a 5 kg load, a glass transition temperature (Tg) of 170° C. The pellets had an average size of about 3 mm by about 1.5 mm and had a Rockwell R hardness (as measured by ASTM D785-85) of 115. The pellets had an angle of 80 to 100 degrees between the cylindrical body and the cut face and a bulk density of about 0.7 g/cc. The pellets used for the purge had an initial MVR at 300° C. with 5 kg load of at least about 20% greater than the colored PPE-PS resin mixture being cleaned from the extruder. There was less than 10% loss of the initial melt viscosity (MVR) of the NORYL PKN4752 purge resin when run through the extruder.

In yet another instance (Example 5) after running 20 kg of the same colored PPE-PS blend as in Comparative Example C, cleaning the feeder and hopper and running the extruder until no more resin came out, the extruder was cleaned/purged using a mixture of 2000 g of a high viscosity high melt strength blow molding grade NORYL™ BN9003 pellets uniformly coated with 20 g of a 20 wt % aqueous solution of sodium dodecyl benzene sulfonate (SDBS). The coating was achieved by 1 minute shaking in a paint shaker. The solution had a pH of 6.5. The coated pellets cleaned the extruder (the extruded strands showed no colored residue) after only 30 minutes, it was not necessary to remove the screw. Not only was the extruder brought to a higher level of cleanliness but did so with a 60% reduction in the amount of resin need to clean the extruder.

The thermoplastic NORYL BN9003 purge pellets comprised a mixture of 36 wt % PPE, 54 wt % of a high impact 12 wt % butadiene modified polystyrene, 4 wt % ethylene ethyl acrylate (EEA) copolymer and 6 wt % poly (styrene ethylene butylene styrene) (SEBS) block copolymer had a high MVR (melt viscosity) of 12 cc/10 min at 280° C. with a 5 kg load, and a high melt elasticity. The pellets had an average size of about 3 mm by about 1.5 mm and a Rockwell R hardness (as measured by ASTM D785-85) of 110. The pellets had an angle of 80 to 100 degrees between the cylindrical body and the cut face and a bulk density of about 0.7 g/cc. The pellets used for the purge had an initial MVR at 280° C. with 5 kg load of at least about 20% greater than the colored PPE-PS resin mixture being cleaned from the extruder. There was less than 10% loss of the initial melt viscosity (MVR) of the Noryl BN90003 purge resin when run through the extruder.

Examples 6, 7, and Comparative Example D

A 85 ton (7.7×10$^4$ kg) Van Dorn single screw hydraulic injection molding machine with a screw having a L/D of 20 and diameter of 35 mm used to mold a polyphenylene ether (PPE)-polystyrene (PS) blend resin comprising the following ingredients: 43.067 wt % polyphenylene ether (PPE), 42.0 wt % high impact polystyrene containing 10.6 wt % butadiene rubber (HIPS3190), 10.0 wt % SEBS rubber (KRATON G1651), 0.5 wt % low density polyethylene (LDPE), 0.1 wt % phosphite stabilizer, 0.15 wt % di-tertbutyl hindered phenol, 0.05 wt % zinc oxide, 0.05 wt % zinc sulfide and colorants comprising: 4.0 wt % titanium dioxide, 0.05 wt % pigment green 36, 0.03 wt % pigment blue 15.4 and 0.003 wt % carbon black. The TiO$_2$ (CAS #13463-67-7) had an average particle size of 0.25 micrometer and had 1.5 wt % of a silica alumina shell. The PPE powder had an intrinsic viscosity (IV) of 0.46 dl/gm. The colored PPE-PS resin was molded into ASTM test parts at 250 to 270° C. using a 35 sec cycle comprising of a 6 sec injection with a 10 sec hold time. Mold temp was 75° C.

In Comparative Example D after the molding was finished the machine was run until no more resin left the barrel it was then purged with (about 4 kg) of pellets of high impact polystyrene; HIPS3190 comprising a butadiene rubber modified polystyrene with 10.6 wt % rubber content. The dry HIP3190 was run for about 45 minutes to mold parts with no residue or color streaks from the previously run colored material. The injection molding machine was judged clean and ready to run the next material.

In Example 6 after another set of parts were molded on the same machine using the same material and settings as Comparative Example D. The injection molding machine was purged with a mixture of 1000 g of thermoplastic NORYL™ PK4752 pellets uniformly coated with 10 g of an aqueous solution of 20 wt % sodium dodecyl benzene sulfonate (SDBS). The surfactant salt solution had a pH of 6.5. The pellets had an average size of about 3 mm by about 1.5 mm and a Rockwell R hardness (as measured by ASTM D785-85) of 115. After just 15 minutes the aqueous alkyl benzene sulfonate salt coated NORYL PK4735 pellet purge was very effective in cleaning the molding machine removing the previously run color material as well as black specks and gels that had built up on the screw. This was a 67% reduction in cleaning time of the molding machine and a 75% reduction in the amount of resin need to clean the injection molding machine.

The NORYL PK4752 thermoplastic purge pellets comprised a mixture of 70 wt % PPE and 30 wt % polystyrene had a high MVR (melt viscosity) of 10 cc/10 min at 300° C. with a 5 kg load, a glass transition temperature (Tg) of 170° C. The pellets were cylindrical with a cut face having an angle of from about 80 to 100 degrees. The pellets had a bulk density of about 0.6 g/cc before coating.

In another experiment (Example 7) after the same molding machine, running the same colored PPE-PS blend as described above, was purged using the uncoated HIP3190 pellets of Comparative Example D. The molding machine, judged to be "clean", was then run with 1000 g of the 1% aqueous alkyl benzene sulfonate salt coated NORYL PK4735 pellets. During the 15 min purge (cleaning) the coated pellet purge of the injection molding machine that had been judged "clean" by visual inspection of the molded parts, showed additional purging of black specks and other contaminants that had not been removed from the screw by the cleaning of the Comparative Example Q. The aqueous alkyl benzene sulfonate salt coated PK4735 pellet purge had removed contaminants that might have broken out later during subsequent molding cycles giving contaminated parts that would be rejected and scrapped.

Example 8 and Comparative Example E

A 70 mm co-rotating intermeshing twin screw extruder with a L/D of 30 was used to make a colored flame retardant ABS blend. The ingredients, including colorants, are shown in Table 1.

TABLE 1

| FR-ABS Ingredient | Wt % |
| --- | --- |
| SAN (105 kDa Mw) | 43.10 |
| HRG (62% rubber) | 29.00 |
| TBrBPA | 18.50 |
| Sb$_2$O$_3$ | 4.10 |
| TSAN | 0.30 |
| EBS wax | 0.70 |
| Phosphite | 0.30 |
| Hindered phenol | 0.20 |
| Hydrotalcite stabilizer | 0.20 |
| Mg Stearate | 0.10 |
| Colorants | |
| TiO2 about 2.5 micrometer | 3.086 |
| Carbon Black | 0.009 |
| Pigment Blue 29 | 0.006 |
| Solvent Red 135 | 0.002 |
| Pigment Yellow 53 | 0.27 |
| Pigment Red 101 | 0.007 |
| Pigment Brown 24 | 0.12 |

The FR-ABS blend comprised: 43.2 wt % styrene acrylonitrile (SAN) comprising 72 wt % styrene and 28 wt % acrylonitrile having a Mw about 105,000 Da, 29.0 wt % of a butadiene rubber graft SAN (62 wt % rubber), 18.5 wt % tetrabromo bisphenol A (TBrBPA), 4.1 wt % antimony oxide (Sb$_2$O$_3$), 0.3 wt % of a SAN encapsulated PTFE (polytetrafluoro ethylene) anti drip agent (TSAN), 0.1 wt % magnesium stearate, 0.2 wt % of a hydrotalcite acid scavenger, 0.3 wt % of a phosphite stabilizer, 0.2 wt % of a hindered phenol antioxidant, 0.7 wt % of an ethylene bis-stearamide mold release in addition to a color package consisting of: 3.05 wt % titanium dioxide with a particle size of 2.5 micrometers encapsulated in 2 wt % of a silica shell, 0.009 wt % carbon black, 0.006 wt % pigment blue 29, 0.002 wt % solvent red 135, 0.27 wt % pigment yellow 53, 0.007 wt % pigment red 101 and 0.12 wt % pigment brown 24.

The standard procedure (Comparative Example E) for preparing the extruder for the next material after running the colored FR-ABS blend was to purge with about 1000 lb (454 kg) of SAN pellets (Mw=105,000 Da) at 400 rpm for at least 1 hour until the extruder showed no residual color in the SAN extrudate. In some instances, for example if the next product to be run on that extruder was a food or medical grade resin where there needs to be no residual bromine or antimony oxide present, it is usually necessary, even after the SAN pellet purge, to remove the screw to fully clean the extruder. After cleaning, the extruder would be reassembled to run the food or medical grade product. This takes at least 3 hr.

In Comparative Example E, as can be seen in Table 2, the standard dry SAN pellet purge after about 1 hr was effective in reducing antimony content from 37,200 ppm to 349 ppm, but there was still antimony in the purge. Even after an additional 15 minute dry SAN pellet purge (about 60 lb (27 kg)) at 150 rpm there was still a residual antimony content (166 ppm) that could be detected.

TABLE 2

| | Dry SAN Purge ppm Sb (ICP) | Coated SAN Purge ppm Sb (ICP) |
|---|---|---|
| FR-ABS End of Run | 37200 | 39200 |
| After about 1 hr Dry Pellet SAN purge | 349 | 666 |
| 5 min additional purge | 214 | 137 |
| 10 min additional purge | 152 | 0 |
| 15 min additional purge | 166 | 0 |

Antimony metal content was determined by weighing 0.5 to 1.0 g of resin sample into a 250 milliliters (ml) Teflon beaker; adding 10 ml of concentrated hydrochloric acid and 3 ml of concentrated nitric acid; and heating the mixture with resin slowly on a hot plate. Once the sample dissolved, it was diluted with 50 ml of high purity water and analyzed by Inductively Coupled Plasma (ICP) optical emission spectrometry. Antimony content was determined as ppm of antimony metal (Sb).

In a second experiment (Example 8) the same extruder was cleaned after processing the same colored FR-ABS blend of Comparative Example E. After about 1 hr dry SAN pellet (about 1000 lb (454 kg)) purging there was still a high (666 ppm) antimony content. The extruder was then purged at 150 rpm with about 60 lb (27 kg) of a purge compound made by coating 50 lb (23 kg) of thermoplastic SAN pellets (Mw=105,000 Da) on a paint shaker for 1 minute with 1 wt % (0.5 lb (0.2 kg)) of a 20 wt % aqueous solution of the sodium salt of a C10 to C16 alkyl benzene sulfonic acid (CAS #68081-81-2). The sulfonate salt solution coated SAN pellet purge was run through the extruder at 150 rpm at 260 to 290° C. Table 2 shows the amount of residual antimony. Using the aqueous sulfonate surfactant salt coated SAN pellet purge antimony content is reduced in 5 minutes to 137 ppm Sb. At 10 minutes there was no detectable antimony in the sample. The coated pellet purge was very effective in cleaning the extruder. Removal and cleaning of the screw was not needed.

The SAN pellets, comprising 72 wt % styrene and 28 wt % acrylonitrile with a Mw about 105,000 Da had an average size of about 3 mm by about 1.5 mm, a Rockwell R hardness (as measured by ASTM D785-85) of 125, a glass transition temperature (Tg) of 115° C. The pellets were cylindrical with a cut face having an angle of from about 80 to 100 degrees. The pellets had a bulk density of about 0.7 g/cc before coating. The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A cleaning mixture, comprising:
   water;
   thermoplastic polymeric resin pellets having a Rockwell R hardness of from 85 to 140 as measured by ASTM D785; and
   a surfactant salt comprises at least one of the following: sulfonate salts, $C_6$ to $C_{36}$ carboxylic acid salts, and mixtures thereof;
   wherein the cleaning mixture has a pH from 6.0 to 9.0.

2. The cleaning mixture of claim 1, wherein the surfactant salt is 0.1 wt % to 9 wt % of the cleaning mixture.

3. The cleaning mixture of claim 1, wherein the thermoplastic polymeric resin pellets are 70 to 99 wt % of the cleaning mixture.

4. The cleaning mixture of claim 1, wherein the water is present in an amount of 0.9 to 12.0 wt % of the cleaning mixture.

5. The cleaning mixture of claim 1, wherein the surfactant salt and the water form an aqueous solution with a pH of 6.0 to 7.0.

6. The cleaning mixture of claim 1, wherein the surfactant salt and the water form an aqueous solution and the aqueous solution has a viscosity of 20 to 1,000 centipoise as measured by ASTM D445 at 23° C.

7. The cleaning mixture of claim 1, wherein the thermoplastic polymeric resin pellets comprise cylinders with an average length of 2.0 to 6.0 mm and an average diameter of 0.5 to 4.0 mm.

8. The cleaning mixture of claim 7, wherein the thermoplastic polymeric resin pellets comprise pellets having at least one angular face and wherein the surfaces defining the angular face meet at an angle of 60 to 120 degrees.

9. The cleaning mixture of claim 8, wherein the thermoplastic polymeric resin pellets have a bulk density of 0.5 to 0.9 g/cc, as measured by ASTM D1895.

10. The cleaning mixture of claim 1, wherein the thermoplastic polymeric resin pellets have a bulk density of 0.5 to 0.9 g/cc, as measured by ASTM D1895.

11. The cleaning mixture of claim 1, wherein the thermoplastic polymeric resin pellets comprise pellets having at least one angular face and wherein the surfaces defining the angular face meet at an angle of 60 to 120 degrees.

12. The cleaning mixture of claim 11, wherein the angle is 80 to 100 degrees.

13. The cleaning mixture of claim 1, wherein the surfactant salt comprises at least one of the following: alkyl aryl sulfonate salts and alkyl sulfate salts.

14. The cleaning mixture of claim 1, wherein the cleaning mixture consists of:
   70 to 99 wt % of the thermoplastic polymeric resin pellets; and
   1 to 30 wt % of an aqueous solution that contains 0.2 to 30 wt % of the surfactant.

15. The cleaning mixture of claim 1, wherein the surfactant salt and the water form an aqueous solution and wherein the thermoplastic polymeric resin pellets are externally coated with the aqueous solution.

16. A cleaning mixture, comprising:
water;
thermoplastic polymeric resin pellets having a Rockwell R hardness of from 85 to 140 as measured by ASTM D785; and
a surfactant salt comprises at least one of the following: sulfonate salts, $C_6$ to $C_{36}$ carboxylic acid salts, and mixtures thereof;
wherein the cleaning mixture has a pH from 6.0 to 9.0;
wherein the surfactant salt and the water form an aqueous solution and the aqueous solution has a viscosity of 20 to 1,000 centipoise as measured by ASTM D445 at 23° C.; and
wherein the thermoplastic polymeric resin pellets comprise cylinders with an average length of 2.0 to 6.0 mm and an average diameter of 0.5 to 4.0 mm.

17. The cleaning mixture of claim 14, wherein the cleaning mixture consists of:
70 to 99 wt % of the thermoplastic polymeric resin pellets; and
1 to 30 wt % of an aqueous solution that contains 0.2 to 30 wt % of the surfactant.

18. The cleaning mixture of claim 15, wherein the surfactant salt comprises a $C_6$ to $C_{36}$ carboxylic acid salt.

19. The cleaning mixture of claim 15, wherein the surfactant salt and the water form an aqueous solution and wherein the thermoplastic polymeric resin pellets are externally coated with the aqueous solution.

\* \* \* \* \*